(12) United States Patent
Marinkin et al.

(10) Patent No.: US 9,854,127 B2
(45) Date of Patent: Dec. 26, 2017

(54) METHOD FOR PROTECTING THE AUTHENTICITY OF AN OBJECT, ITEM, DOCUMENT, PACKAGING AND/OR A LABEL FROM IMITATION, FORGERY AND THEFT

(71) Applicants: Dmitri Marinkin, Harju maakond (EE); Aleksandr Volohhonski, Harju maakond (EE)

(72) Inventors: Dmitri Marinkin, Harju maakond (EE); Aleksandr Volohhonski, Harju maakond (EE)

( * ) Notice: Subject to any disclaimer, the term of this patent is extended or adjusted under 35 U.S.C. 154(b) by 28 days.

(21) Appl. No.: 15/073,823

(22) Filed: Mar. 18, 2016

(65) Prior Publication Data
US 2017/0006182 A1 Jan. 5, 2017

(30) Foreign Application Priority Data
Jul. 1, 2015 (EE) .................................. 201500024

(51) Int. Cl.
*G07D 7/00* (2016.01)
*B42D 15/00* (2006.01)
(Continued)

(52) U.S. Cl.
CPC ......... *H04N 1/32256* (2013.01); *B42D 15/00* (2013.01); *G06T 1/0028* (2013.01);
(Continued)

(58) Field of Classification Search
CPC B42D 15/00; G06K 19/06037; G06T 1/0028; G07D 7/00; G07D 7/004; G07D 7/0047; G09F 3/0292; H04N 1/32192; H04N 1/32256; H04N 1/32283; H04N 1/32309
See application file for complete search history.

(56) References Cited

U.S. PATENT DOCUMENTS

| 5,790,703 | A | * | 8/1998 | Wang | ................. | G06T 1/0028 |
|---|---|---|---|---|---|---|
| | | | | | | 235/494 |
| 8,740,088 | B2 | | 6/2014 | Marguerettaz et al. | | |
| 2002/0170966 | A1 | * | 11/2002 | Hannigan | ............. | G06F 3/0317 |
| | | | | | | 235/462.01 |

FOREIGN PATENT DOCUMENTS

WO WO-2013063871 A1 5/2013

* cited by examiner

*Primary Examiner* — Siamak Harandi
(74) *Attorney, Agent, or Firm* — Robert P. Michal, Esq.; Carter, DeLuca, Farrell & Schmidt, LLP

(57) ABSTRACT

The invention describes a method for protecting the authenticity of an object, item, document, packaging and/or a label from imitation, forgery and theft, whereas during such marking by means of graphic halftone visually encoded image keeping qualitative-quantitative data of an subject and containing a hidden verification hash code in the form of a digital watermark (DWM), square data cells of the cross-linked structure of the graphic halftone image with identical brightness values are revealed in the entire area inside the revealed square data cell, thereafter a square-cross-linked mask is formed to store the base of the revealed readable data cells, the applied digital watermark (DWM) is read and opposed by means of comparison of the brightness of color components of the central of the revealed readable data cell against the arithmetic mean value of the brightness of the components of the eight neighbor squares surrounding the revealed readable data cell.

2 Claims, 3 Drawing Sheets
(3 of 3 Drawing Sheet(s) Filed in Color)

(51) Int. Cl.
*H04N 1/32* (2006.01)
*G06T 1/00* (2006.01)
(52) U.S. Cl.
CPC ........... *G07D 7/00* (2013.01); *H04N 1/32192* (2013.01); *H04N 1/32283* (2013.01); *H04N 1/32309* (2013.01); *G06T 2201/0051* (2013.01)

METHOD FOR PROTECTING THE AUTHENTICITY OF AN OBJECT, ITEM, DOCUMENT, PACKAGING AND/OR A LABEL FROM IMITATION, FORGERY AND THEFT

CROSS-REFERENCE TO RELATED APPLICATION

The present application claims priority under 35 USC 119 to Estonian Patent Application Serial No. P201500024 filed Jul. 1, 2015, the entire disclosure of which is incorporated by reference herein in its entirety.

TECHNICAL FIELD

The present disclosure relates to a method for protection of the authenticity of an object, item, document, packaging and/or a label and can be used by companies, governmental authorities, and/or banks.

BACKGROUND INFORMATION

At the present time, methods are known for the protection of the authenticity of an object, item, document, packaging and/or a label against imitation and counterfeiting. A known anti-counterfeiting method, label and label manufacturing method is based on 2D graphical coding (see, WO2013063871 A1, Int.Cl.G06K9/18, Yue Tiegang, Lin Feng (CN), date of publication Oct. 5, 2013).

The aforementioned document relates to a method for the protection of goods against counterfeiting with the help of a two-dimensional code. That is, a two-dimensional code is applied onto an article; the two-dimensional code is read with the help of a special image reading device; after reading the received information is processed by a special device; the received information is compared with the information saved in the server database; if the information read from the security code matches the information saved in the digital database, the article is considered authentic, otherwise it is considered a counterfeit. The novelty of the method is the use of one two-dimensional code, which is applied to two image carriers, whereas the second carrier is attached to the surface of the first carrier.

The aforementioned method has drawbacks in that:
marking of the article's surface by a code with a two-dimensional image is possible only when using paper based data;
there is a low protection level against unauthorized replication;
there is a weak verification level based on visual-optical identification of the shared boundary of two hard copies of a two-dimensional code;
there is a restricted possibility for using different printing types, impossible to use optical or laser marking;
there is an absence of protection against false reading of the two-dimensional code.

A second known invention relates to the identification and authentication using liquid crystal material markings (see, U.S. Pat. No. 8,740,088 B2, Int.Cl.G06K 19/00, Sicpa Holding SA, Prilly (CH), Jun. 3, 2014).

The second known invention is a method for identification of an object, article and item having at least one marking and including the following stages: applying marking, exposure of light on the marking, reading of the marking indication and receiving of respective information, matching of data received from the indication with the information of a database and receiving confirmation or rejection of authenticity of an object or an item. Marking of polymer liquid-crystal material with definite optical characteristics is applied onto an object, article or item in the process of printing of different data in the form of digital indication containing a unique code, such as a one- or two-dimensional bar code or matrix code.

The aforementioned method has drawbacks in that:
there is an impossibility of applying the marking onto the surface of an object, good and item by optical and laser devices;
as marking of the surface of an object, article and item is performed by means of polymer liquid-crystal materials that change their properties at temperature fluctuations and when exposed to sunlight, there appears to be difficulties in authentication by known standard manual and stationary devices;
there is an impossibility of reuse after recycling of an object, article and item;
it is necessary to point out that disposal of any polymers and polymer resins requires special ecological treatment systems.

SUMMARY

The present disclosure relates to authentication of an object, item, document, packaging and/or label by means of manual and stationary devices for image reading and data exchange as well as improvement of protection quality and better security for verification of authenticity of and object, item, document, packaging and/or label from imitation, forgery and theft.

For achieving the set goal a method is proposed for protection of authenticity of an object, item, document, packaging and/or label against imitation, counterfeiting and theft based on marking by a visually encoded image, which consists of the following:

Marking of the surface of an object, item, document, packaging and/or label is performed by means of a graphic halftone visually encoded image keeping qualitative-quantitative data of an object, item and/or document and containing a verification hash code in the form of a digital watermark (DWM), square data cells of the graphic halftone image of the cross-linked structure with identical brightness values are revealed in the entire area inside the revealed square data cell, revealed square data cells are conditionally divided into nine equal squares, a digital watermark (DWM) is applied by means of correction of the brightness of color components of the central square out of the nine squares of each revealed readable square data cell, being identified on the basis of a durable read algorithm depending on the encoded qualitative-quantitative data of an object, item and/or document with the use of encoding, hashing and information redundancy algorithms, followed by formation of a cross-linked mask to store the base of the revealed readable data cells, the applied digital watermark (DWM) is read and opposed to the brightness of color components of the central square of the revealed readable data cell against the arithmetic mean value of the brightness of the components of the eight neighbor squares surrounding the revealed readable data cell.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The claimed method for protecting the authenticity of an object, item, document, packaging and/or label from imitation, forgery and theft based on marking by means of visually encoded image consists of the following stages:

1. Identification of the size of qualitative-quantitative data, required for authentification of an object, item, document, packaging and/or label and formation of graphic halftone image containing qualitative-quantitative data of an object, item and/or document.

Halftone image is an image that contains a set of tone values and their continuous, gradual change. Examples of halftone images can be drawings, logos, paintings, photos, which, being raster images, are digitally encoded with the help of a matrix bit map keeping the values of the image elements (pixels).

The marked graphic halftone image contains qualitative-quantitative data of the protected object, item and/or document (name, serial number, expiry date, etc.) in visual form (packaging or label).

Figure 1:
FIG. 1 is a graphic halftone image keeping a small amount of qualitative-quantitative data of an object, item and/or document.

If the volume of qualitative-quantitative data of an object, item and/or document is not large, then any halftone image containing qualitative-quantitative data of an object, item and/or document can be used as graphic halftone image. FIG. 1.

Figure 2:
FIG. 2 is a halftone image keeping a large amount of qualitative-quantitative data of an object, item and/or document.

If the volume of qualitative-quantitative data is larger than the size of the halftone image able to accommodate a digital watermark (DWM) in itself, then, to increase the volume of protected qualitative-quantitative data of an object, item and/or document, two-dimensional matrix codes are used as graphic halftone image, that are able to contain sufficient amount of data, for instance—the Aztec Code. FIG. 2.

Graphic halftone image is formed with the help of computer raster graphics editor.

2. Identification of the size of digital watermark (DWM) data and calculation of verification hash code of qualitative-quantitative data of an object, item and/or document.

Digital watermark (DWM) contains a verification hash code of qualitative-quantitative data of an object, item and/or document included in the graphic halftone image. As the data volume contained in the graphic halftone image and the data volume in the digital watermark (DWM) are linearly dependent, but there is no univocal correspondence between initial data and hash sum due to the fact that the amount of hash functions values is smaller than the number of versions of input array values and there are many arrays with different content, but giving identical hash codes—the so called collisions.

Probability of collisions is important for evaluation of the quality of hash functions. There exists a variety of hashing algorithms with different properties, namely: width, computational complexity, cryptosecurity. Selection of one or another hash function is determined by specifics of the task to be solved. Examples of hash codes can be a reference sum or cyclic redundancy code (CRC).

In case if the size of the embedded digital watermark (DWM) data is small and there are suspicions that the stegosystem reliability might be reduced, it is suggested to embed redundancy data or additional noise into the digital watermark (DWM).

For illustration purposes, number 12 selected by pseudo-random-number generator, written in binary form as 1100, is used as a verification hash code.

3. Allocation and identification of graphic halftone image parts suitable for applying and durable reading of digital watermark (DWM) from the surface of an object, item, packaging, document and/or label.

Figure 3:
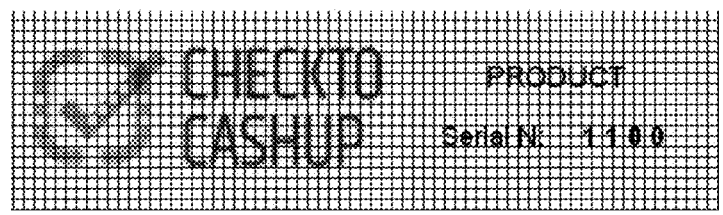
FIG. 3 is a cross-linked structure with revealed readable square data cells, applied onto a graphic halftone image with a small amount of data of the object, item and/or document.

For identification and allocation of graphic halftone image parts suitable for applying and durable reading of digital watermark (DWM) a cross-linked structure is applied onto the created graphic halftone image containing data of an object, item and/or document, and such square data cells of the cross-linked structure are revealed, the tone brightness values of which are identical in the entire area inside the cell. The revealed square data cells of the cross-linked structure are converted into an ordered square-cross-linked mask, where data are kept about the location of the revealed square cells that are suitable for applying and durable reading of the digital watermark (DWM). The revealed readable square data cells are highlighted in yellow. FIG. 3.

Figure 4:
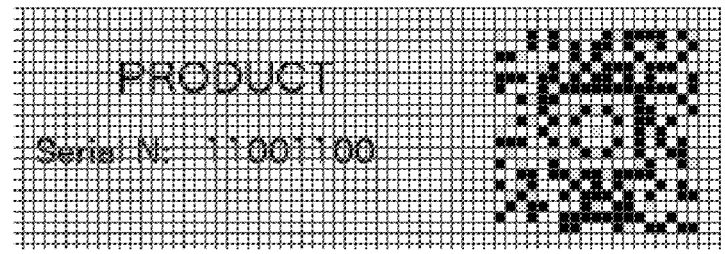
FIG. 4 is a cross-linked structure with revealed readable square data cells, applied onto a graphic halftone image with a large amount of data of an object, item and/or document.

In case, if a two-dimensional matrix code, for instance the Aztec Code, is used as graphic halftone image, such graphic halftone image already contains a cross-linked structure with ordered revealed square cells in the form of Aztec Code elements, that are able to contain a sufficient amount of data about an object, item and/or document. The revealed readable square data cells are highlighted in yellow. FIG. 4.

4. Applying digital watermark (DWM) onto the revealed readable square data cells of the graphic halftone image.

Figure 5:
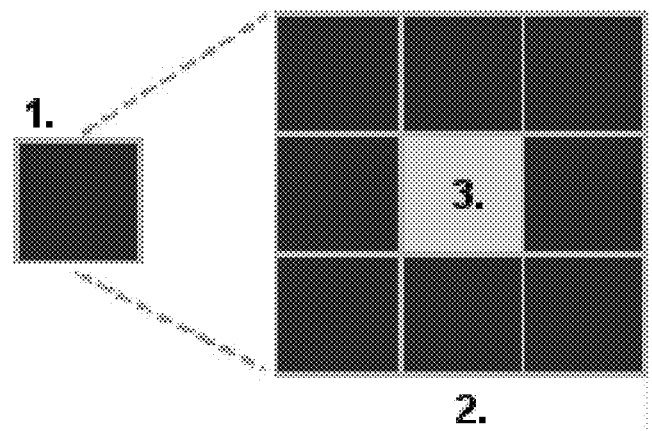
FIG. 5 is a conditional scaling of the revealed readable square data cell and identification of the central square as the working area inside the revealed readable square data cell, where in the figure:
  1—revealed readable square data cell,
  2—enlarged revealed readable square data cell conditionally divided into nine equal squares (3×3),
  3—the central square, one of nine, of the enlarged conditionally divided revealed readable square data cell.

To embed a digital watermark (DWM) into a graphic halftone image, each revealed readable square data cell (1) of the graphic halftone image is conditionally divided into nine equal squares and as a result of conditional scaling, in the enlarged revealed readable square data cell (2) each central square (3) out of the nine equal squares is identified as the working area of the revealed readable square data cell. FIG. 5.

Applying of digital watermark (DWM) data onto prepared graphic halftone image is performed by modifying the brightness value of the central square (3) out of the nine equal squares of the revealed readable square data cell (2) of the cross-linked structure, where each bit of the verification hash code is assigned to one revealed readable square data cell (1) of the cross-linked structure. The amount of the embedded data of a digital watermark (DWM) in a graphic halftone image depends on the amount of revealed square data cells (1) of the cross-linked structure that are suitable for applying and durable reading of the digital watermark (DWM) and capacity is one data bit per one revealed readable square data cell (1) of the cross-linked structure. The size and amount of revealed readable square data cells of the cross-linked structure are selected by the condition of durable reading of the digital watermark (DWM) by a manual or stationary scanning device for reading and transfer of data subject to its properties.

If a two-dimensional matrix code, for instance, the Aztec Code, is used as graphic halftone image, each element of the Aztec Code is conditionally divided into nine equal squares. The group of 3×3 equal squares is an element of the Aztec Code and the central square (3)—one of the nine equal squares of each Aztec Code element is identified as the working area of the revealed readable square data cell (1) of the cross-linked structure. FIG. 5.

Digital watermark (DWM) is embedded into the Aztec Code by modifying the brightness value of the central square of each Aztec Code element. When forming a graphic halftone image on the Aztec Code example, each data bit of verification hash code is assigned to one light or one dark element of the Aztec Code. The size of embedded data of digital watermark (DWM) in the Aztec Code depends on the number of Aztec Code elements and capacity is one data bit per element.

5. Method of applying and reading of digital watermark (DWM).

To apply the value of a digital watermark (DWM) hash code onto prepared graphic halftone image, which has {1,1,0,0} bit stream, applying is performed onto revealed readable square data cells of the graphic halftone image or onto revealed Aztec Code elements, shown in this example, before scaling each component {R, G, B} has the value of {0/255,0/255,0/255},—this is a black-and-white version of the two-dimensional code. Applying of a digital watermark (DWM) onto a color graphic halftone image is made by analogous method.

Figure 6:
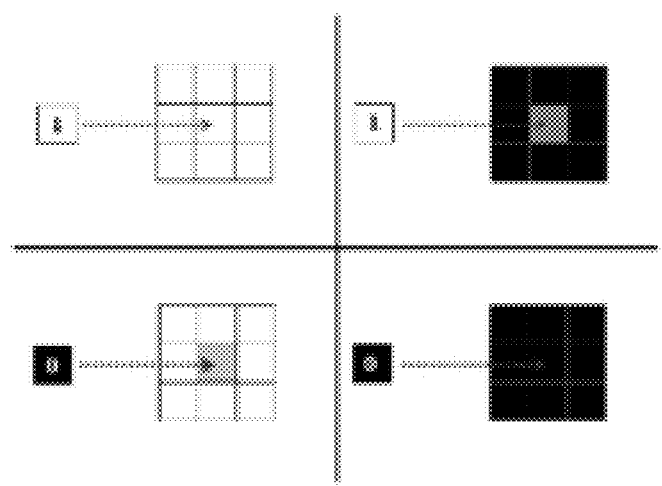
FIG. 6 is an application scheme of digital watermark (DWM) data onto the revealed readable square data cell.

Alternatively to the rule of two-dimensional codes' generation, including the Aztec Code, when applying a digital watermark (DWM), the light central square in the area of a light and dark revealed readable square data cell encodes a logical one and the dark central square in the area of the light and dark revealed cell encodes a logical zero. FIG. 6.

Thus, the adjustment of the value of the central square of the revealed readable square data cell or Aztec Code element by some value $\pm\Delta$ is needed only in two cases out of four: when embedding one into the square of dark cells ($+\Delta$) and zero—into the square of light cells ($-\Delta$).

Adjustment of the value of the central square for each component {R, G, B} in such cases is performed according to Formula 1.

$$p'_{i,j} = \begin{cases} p_{i,j-\Delta}, & p_{i,j} = 255; \\ p_{i,j+\Delta}, & p_{i,j} = 0. \end{cases}$$

where:

$P_{ij}$—brightness value of the central square before adjustment;

$P_{ij}$—brightness value of the central square after adjustment;

$\Delta$—adjustment value, some integral of the (0,127) integral.

Robbing of each data bit of DWM is made according to Formula 2 and Formula 3.

$$\Delta = \frac{\begin{aligned}&p_{i-1,j-1} + p_{i-1,j} + p_{i-1,j+1} + \\ &p_{i,j-1} + p_{i,j+1} + p_{i+1,j-1} + p_{i+1,j} + p_{i+1,j+1}\end{aligned}}{8} - p_{i,j}$$

$$m_k = \begin{cases} 1, & \acute{\Delta} \leq -\Delta, \acute{\Delta} + p_{ij} \leq 127; \\ 0, & \acute{\Delta} > -\Delta, \acute{\Delta} + p_{ij} \leq 127; \\ 0, & \acute{\Delta} \geq \Delta, \acute{\Delta} + p_{ij} > 127; \\ 1, & \acute{\Delta} < \Delta, \acute{\Delta} + p_{ij} > 127; \end{cases}$$

where:

$P_{ij}$—brightness value of the central square after reading;

$P_{i-1\ j-1}$, $P_{i-1\ j}$, $P_{i-1\ j+1}$, $P_{ij-1}$, $P_{ij+1}$, $P_{i+1\ j-1}$, $P_{i+1\ j}$, $P_{i+1\ j+1}$—brightness value of the neighbor squares after reading;

$\Delta$—adjustment value of the central square after reading;

$\Delta$—adjustment value from Formula 1;

$m_k$—m is a remote DWM bit of variable k.

In practical implementation of the claimed method different adjustment values $\Delta$ from 1 to 127 are used and yet a possibility is fixed for reading by standard manual and stationary devices; high percentage of correctly robbed data of the digital watermark (DWM) and visual stability is evaluated as well as resistance against unauthorized replication of graphic halftone image. The selected adjustment value $\Delta=10$ and higher in algorithms of applying and removal of digital watermark (DWM) does not destroy visual stability and simultaneously complies with the requirement for reading the Aztec Code by manual and stationary devices and results in 100% reading of the digital watermark (DWM).

6. Verification of authenticity of an object, item and/or document by opposing the reading results of the digital watermark (DWM) to the data contained in the cross-linked mask keeping the base of the revealed readable square data cells.

Verification of authenticity of an object, item and/or document is performed by reading the data from graphic halftone image and verification hash code from the digital watermark (DWM), opposing the results and comparing the received data. A positive result of comparison of hash code of input array contained in the graphic halftone image against the read hash sum from the digital watermark (DWM) allows to assert the authenticity of the graphic halftone image.

In case of illegal visual copying of the graphic halftone image distortions of different nature appear, which result in partial loss of the brightness of the read central squares of the digital watermark (DWM), what reflects in the hash function results and allows to assert forgery of an object, item and/or document.

In case of replacement, absence or loss of data or part thereof, as a result of illegal copying of the graphic halftone image or digital watermark (DWM), the result of the verification hash code does not match with the initial value, what gives a possibility to assert the fact of forgery or illegal copying of an object, item and/or document.

At attempt of illegal copying of one or some limited amount of protected images for a whole lot of illegal objects, items and/or documents, verification will reveal repeated serial numbers in the lot of illegal objects, items and/or documents and verification with different geographical coordinates.

Thus, the disclosure enables:
1. performance of applying and reading of marking on the surface of an object, item, document, packaging and/or label by standard manual and stationary devices;
2. significantly improve the reliability of protection and authentication of original objects, items and documents;
3. significantly speed up and facilitate search and detection of thefts;
4. perform recycling of packaging and label with an applied marking and avoid using of special treatment systems; and
5. significantly reduce costs related to authentication of original objects, items and/or documents, for instance: certification of fire-hazardous objects, anti-counterfeit protection of pharmaceuticals and foodstuffs, checking of permits and tickets.

The invention claimed is:

1. A method for protecting authenticity of an object, item, document, packaging, or a label from imitation, forgery and theft, the method comprising:
    applying security marking onto a surface of the object, item, document, packaging, or label; and
    verifying authenticity of the object, item, document, packaging or label by reading the marking from the surface of the object, item, document, packaging, or label,
    wherein applying the security marking on the surface of the object, item, document, packaging, or label includes applying a graphic halftone visually encoded image keeping qualitative-quantitative data of the object, item, document, packaging, or label and containing a hidden verification hash code in the form of a digital watermark (DWM), square data cells of a cross-linked structure of the graphic halftone image with identical brightness values are revealed in an entire area inside a revealed square data cell, the revealed square data cells are conditionally divided into nine equal squares, a digital watermark (DWM) is applied by means of adjustment of the brightness of color components of a central square out of the nine squares of each revealed readable square data cell, identified on the basis of a durable read algorithm depending on the encoded qualitative-quantitative data of the object, item, document, packaging, or label with the use of encoding, hashing and information redundancy algorithms, thereafter a square-cross-linked mask is formed to store a base of the revealed readable square data cells, wherein reading the marking from the surface includes reading the applied digital watermark (DWM) and comparing the brightness of color components of the central square of the revealed readable square data cell against an arithmetic mean value of a brightness of components of eight neighbor squares surrounding the revealed readable square data cell.

2. A method for protecting authenticity of an object, the method comprising:
    applying security marking onto a surface of the object by:
        identifying a revealed square data cell within square data cells of a cross-linked structure of the graphic halftone image on the basis of a durable read algorithm based on the encoded data of the object with the use of encoding, hashing, and information redundancy algorithms, the graphic halftone image having identical brightness values such that the revealed square data cell is revealed in an entire area inside the revealed square data cell
        forming a square-cross-linked mask to store a base of revealed readable square data cells;
        dividing each of the revealed square data cells into nine equal squares; and
        adjusting the brightness of color components of a central square of the nine equal squares to apply a digital watermark (DWM) to each of the revealed square data cells; and
    verifying authenticity of the object by:
        reading the security marking from the surface of the object by reading the applied digital watermark (DWM); and
        comparing the brightness of color components of the central square of the revealed readable square data cell against an arithmetic mean value of a brightness of components of eight neighbor squares surrounding the revealed readable square data cell.

* * * * *